United States Patent [19]
Martin

[11] Patent Number: 6,135,532
[45] Date of Patent: Oct. 24, 2000

[54] RECREATIONAL VEHICLE AND SPECIALIZED TAIL GATE AND LOADING RAMP

[75] Inventor: Larry Martin, Goshen, Ind.

[73] Assignee: Thor Tech, Inc., Las Vegas, Nev.

[21] Appl. No.: 09/268,924

[22] Filed: Mar. 16, 1999

Related U.S. Application Data

[60] Provisional application No. 60/078,596, Mar. 19, 1998.

[51] Int. Cl.[7] .............................. B60P 1/43; B60P 3/363
[52] U.S. Cl. ........................... 296/61; 296/158; 14/71.1; 414/537
[58] Field of Search ............................. 296/57.1, 61, 62, 296/158; 14/71.1, 69.5; 414/537

[56] References Cited

U.S. PATENT DOCUMENTS

| | | | |
|---|---|---|---|
| 887,167 | 5/1908 | Wilkes | 49/37 |
| 2,215,631 | 9/1940 | Young | 296/61 |
| 2,424,862 | 7/1947 | Stuart | 414/537 |
| 3,961,716 | 6/1976 | Renaud | 214/85 |
| 4,037,564 | 7/1977 | Schrock | 296/61 |
| 4,068,770 | 1/1978 | Boehringer | 214/85 |
| 4,084,713 | 4/1978 | Rihrs et al. | 214/85 |
| 4,475,761 | 10/1984 | Milroy et al. | 296/61 |
| 4,579,500 | 4/1986 | Robinson | 414/545 |
| 4,761,847 | 8/1988 | Savage et al. | 14/69.5 |
| 4,854,631 | 8/1989 | Laursen | 296/158 |
| 5,259,081 | 11/1993 | Henderson | 14/71.1 |
| 5,312,148 | 5/1994 | Morgan | 296/61 |
| 5,393,192 | 2/1995 | Hall et al. | 414/537 |
| 5,400,733 | 3/1995 | Richter | 114/258 |
| 5,769,593 | 6/1998 | Buffaloe | 414/537 |
| 5,791,717 | 8/1998 | Reich et al. | 296/61 |
| 5,954,383 | 9/1999 | Beck et al. | 296/50 |

FOREIGN PATENT DOCUMENTS

| | | | |
|---|---|---|---|
| 2597420 | 10/1987 | France | 296/57.1 |
| 943214 | 5/1956 | Germany | 296/57.1 |

*Primary Examiner*—Dennis H. Pedder
*Assistant Examiner*—Paul Chenevert
*Attorney, Agent, or Firm*—Killworth, Gottman, Hagan & Schaeff L.L.P.

[57] ABSTRACT

In accordance with one embodiment of the present invention, a recreational vehicle is provided including a loading ramp assembly. The loading ramp assembly comprises first and second loading ramp panels, first, second, third, and fourth pairs of cable supports, a cable drive assembly, a load cable, and a cable linkage assembly. The first loading ramp panel is secured proximate the bottom portion of the access opening so as to pivot relative thereto. The second loading ramp panel is secured proximate the second transverse edge of the first panel so as to permit the second panel to pivot relative to the first panel. The cable drive assembly includes a drive cable and a cable translation mechanism. The load cable is secured between the respective ones of a pair of cable supports secured to the second panel. The cable linkage assembly is arranged to couple movement of the drive cable with movement of the load cable, wherein the linkage assembly and the cable supports are arranged to distribute a uniform load over the load cable. The loading ramp assembly may be arranged to permit the first and second loading ramp panels to pivot in opposite directions between an extended position and a retracted position where the retracted position is characterized by substantially vertical alignment of the first and second panels and the extended position is characterized by a decreasing degree of inclination from the first panel to the second panel.

36 Claims, 8 Drawing Sheets

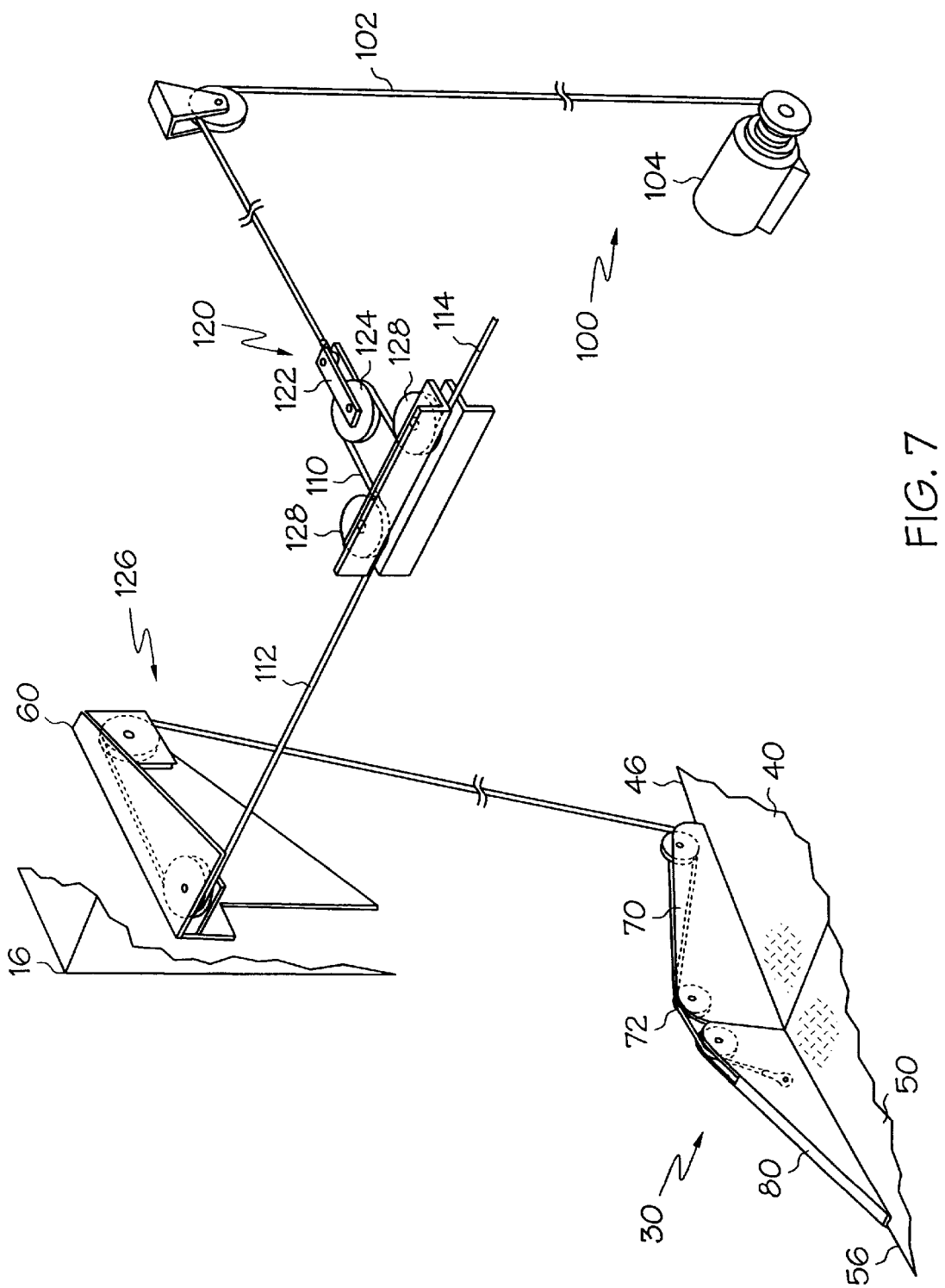

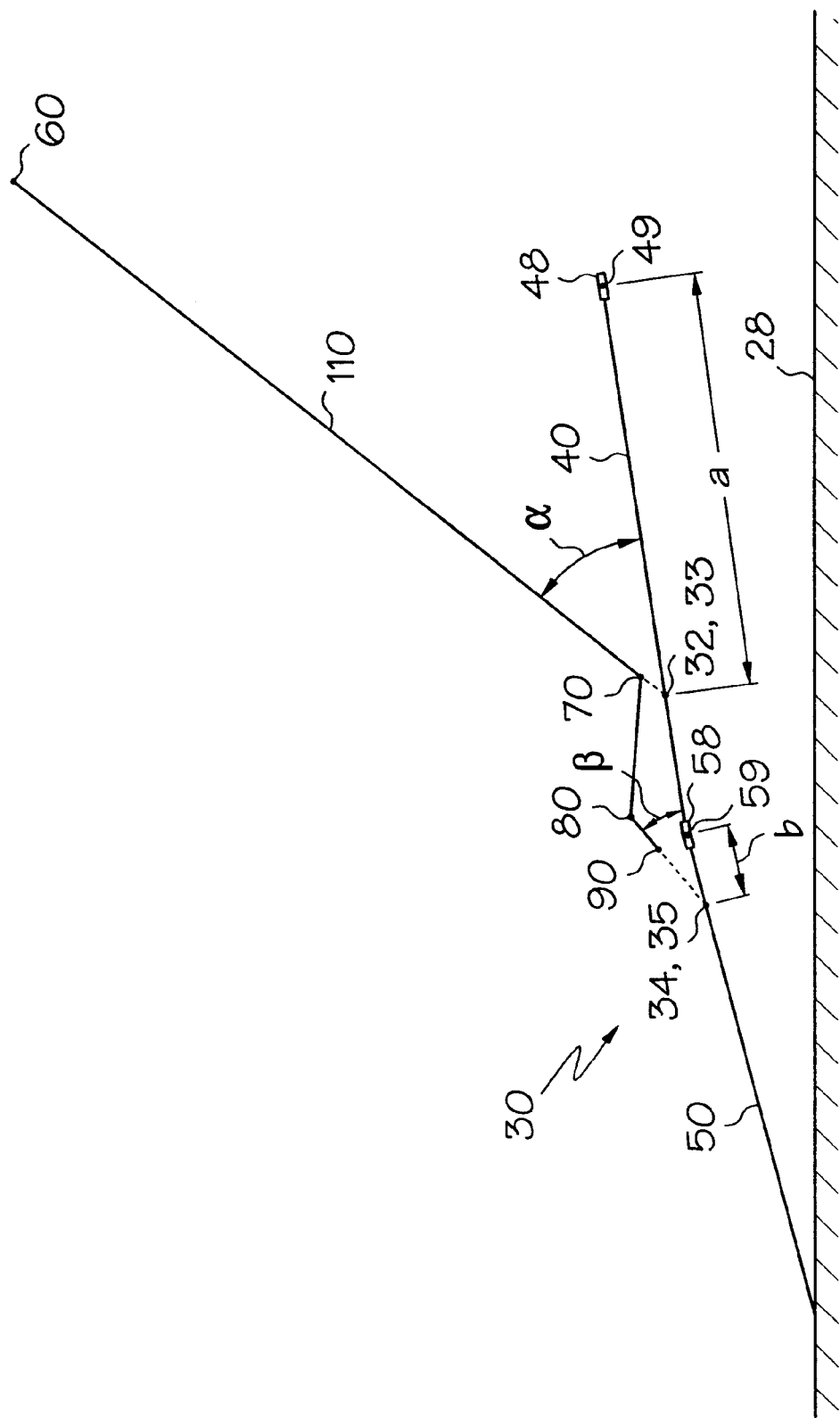

RECREATIONAL VEHICLE AND SPECIALIZED TAIL GATE AND LOADING RAMP

CROSS REFERENCE TO RELATED APPLICATIONS

This application claims the benefit of U.S. Provisional Application No. 60/078,596, filed Mar. 19, 1998.

BACKGROUND OF THE INVENTION

The present invention relates to a recreational vehicle and a specialized loading ramp assembly and, more particularly, to a loading ramp assembly that may be arranged to function as a loading ramp and tail gate for a recreational vehicle.

Recreational vehicles, such as motor homes, have become increasingly popular in that they provide both transportation and temporary living quarters for users. Many users of recreational vehicles also own other recreational equipment, such as snowmobiles, motorcycles, personal water craft, etc., and need to transport these devices securely when traveling. For example, motorcycles, snowmobiles, and similar devices are relatively heavy and it is difficult to load and unload these vehicles from the volume in which they are stored and transported. Accordingly, there exists a continuing demand in the industry to incorporate convenient, spacious, and easy-to-use storage areas into the design of many recreational vehicles. Further, there is a continuing demand in the industry for a user friendly, heavy duty loading ramp assembly.

BRIEF SUMMARY OF THE INVENTION

This need is met by the present invention wherein a storage area of a recreational vehicle is secured by a tail gate which unfolds into a ramp to permit articles to be easily moved into and out of the storage area by either moving or driving the articles up or down the ramp.

In accordance with one embodiment of the present invention, a recreational vehicle is provided comprising a chassis, a cab, a body mounted on the chassis, and a loading ramp assembly. The body includes a living area and a storage area defined therein. A substantially vertical access opening is also defined in the storage area and includes substantially horizontal top and bottom portions and a pair of substantially vertical side portions extending between the top and bottom portions. The loading ramp assembly comprises first and second loading ramp panels, first, second, third, and fourth pairs of cable supports, a cable drive assembly, a load cable, and a cable linkage assembly.

The first loading ramp panel defines upper and lower panel surfaces, first and second transverse edges, and first and second side edges. The first transverse edge is secured proximate the bottom portion of the access opening so as to permit the first panel to pivot relative to the bottom portion of the access opening. The second loading ramp panel defines upper and lower panel surfaces, third and fourth transverse edges, and third and fourth side edges. The third transverse edge is secured proximate the second transverse edge of the first panel so as to permit the second panel to pivot relative to the first panel.

The first pair of cable supports include one support arranged along one of the pair of substantially vertical side portions of the access opening and another support arranged along the other of the pair of substantially vertical side portions of the access opening. The second pair of cable supports include one support arranged along the first side edge of the first panel and another support arranged along the second side edge of the first panel.

The third pair of cable supports include one support aligned with one of the second pair of cable supports and another support aligned with the other of the second pair of cable supports. The fourth pair of cable supports include one support arranged proximate the third side edge of the second panel and another support arranged proximate the fourth side edge of the second panel.

The cable drive assembly includes a drive cable and a cable translation mechanism. The load cable is secured between the respective ones of the fourth pair of cable supports and extends there between through the remaining cable supports. The cable linkage assembly is arranged to couple movement of the drive cable with movement of the load cable, wherein the linkage assembly and the cable supports are arranged to distribute a uniform load over the load cable.

In accordance with another embodiment of the present invention, a vehicle is provided comprising a substantially vertical access opening defining substantially horizontal top and bottom portions, a pair of substantially vertical side portions extending between the top and bottom portions, and a loading ramp assembly. The loading ramp assembly comprises first and second loading ramp panels, first, second, third, and fourth pairs of cable supports, a cable drive assembly, a load cable, and a cable linkage assembly.

The first loading ramp panel defines upper and lower panel surfaces, first and second transverse edges, and first and second side edges. The first transverse edge is secured proximate the bottom portion of the access opening so as to permit the first panel to pivot relative to the bottom portion of the access opening. The second loading ramp panel defines upper and lower panel surfaces, third and fourth transverse edges, and third and fourth side edges. The third transverse edge is secured proximate the second transverse edge of the first panel so as to permit the second panel to pivot relative to the first panel.

The first pair of cable supports include one support arranged along one of the pair of substantially vertical side portions of the access opening and another support arranged along the other of the pair of substantially vertical side portions of the access opening. The second pair of cable supports include one support arranged along the first side edge of the first panel and another support arranged along the second side edge of the first panel.

The third pair of cable supports include one support aligned with one of the second pair of cable supports and another support aligned with the other of the second pair of cable supports. The fourth pair of cable supports include one support arranged proximate the third side edge of the second panel and another support arranged proximate the fourth side edge of the second panel.

The cable drive assembly includes a drive cable and a cable translation mechanism. The load cable is secured between the respective ones of the fourth pair of cable supports and extends there between through the remaining cable supports. The cable linkage assembly is arranged to couple movement of the drive cable with movement of the load cable, wherein the linkage assembly and the cable supports are arranged to distribute a uniform load over the load cable.

The first pair of cable supports and the second pair of cable supports may define a first pair of leverage points, one of which is spaced a first predetermined distance from the bottom portion of the access opening along the first side edge of the first panel and the other of which is spaced the first predetermined distance from the bottom portion of the access opening along the second side edge of the first panel. Similarly, the third pair of cable supports and the fourth pair of cable supports may define a second pair of leverage points, one of which is spaced a second predetermined distance from the third transverse edge of the second panel along the first side edge and the other of which is spaced the second predetermined distance from the third transverse edge of the second panel along the second side edge.

The first predetermined distance may be greater than the second predetermined distance. The first pair of leverage angles may be greater than the second pair of leverage angles. The cable drive assembly, the first pair of leverage points, and the associated first pair of substantially equal leverage angles may be arranged to define a first torque about a first pivot axis of the first panel, and the cable drive assembly, the second pair of leverage points, and the associated second pair of substantially equal leverage angles may be arranged to define a second toque about a second pivot axis of the second panel. The first torque is preferably greater than the second torque. Further, the first torque preferably exceeds a first opposing gravitational torque of the first panel about the first pivot, and the second torque is preferably less than a second opposing gravitational torque of the second panel about the second pivot axis, whereby the first loading ramp panel and the second loading ramp panel pivot in opposite directions as the cable drive assembly is operated.

The first transverse edge of the first loading ramp panel is preferably secured to the bottom portion of the access opening with a first hinge assembly arranged to permit the first panel to pivot relative to the access opening about a first transverse axis defined by the first hinge assembly. Similarly, the third transverse edge of the second loading ramp panel is preferably secured to the second transverse edge of the first loading ramp panel with a second hinge assembly arranged to permit the second panel to pivot relative to the first panel about a second transverse axis defined by the second hinge assembly.

An abutment surface may be secured to one or both of the first and second panels and may be arranged to limit the degree the second panel is permitted to pivot about the axis defined by the second hinge assembly. Preferably, the abutment surface comprises complementary abutment surfaces, one of which is secured to the first panel and one of which is secured to the second panel. The first loading ramp panel, the second loading ramp panel, the second hinge assembly, and the abutment surface are arranged to permit the first and second panels to pivot between a retracted position characterized by contact between the lower panel surfaces of the first and second panels, and an extended position defined between the retracted position and a position prior to a point at which the first and second panels would lie in a common plane. Where, the bottom portion of the access opening is positioned at a predetermined height above a ground-level reference, the loading ramp assembly is preferably arranged such that the first and second loading ramp panels reach the extended position no later than, and more preferably simultaneously with, a point at which the fourth transverse edge reaches the ground-level reference.

The loading ramp assembly may be arranged to permit the first and second loading ramp panels to pivot in opposite directions between an extended position and a retracted position where the retracted position is characterized by substantially vertical alignment of the first and second panels and the extended position is characterized by a decreasing degree of inclination from the first panel to the second panel.

The first panel and the first hinge assembly may be arranged to permit the second panel to pivot between an extended position and a retracted position, and the retracted position is preferably characterized by substantially vertical alignment of the first panel over the vertical access opening. The first panel is preferably at least as large as the vertical access opening. The vertical access opening may define an access opening periphery including a peripheral seal arranged along the access opening periphery. The first panel may be arranged to abut the peripheral seal along substantially all of the access opening periphery.

The loading ramp assembly may further comprise a locking assembly arranged to secure the first and second loading ramp panels in a retracted position characterized by contact between the lower panel surfaces of the first and second panels. The locking assembly may comprise a cam locking mechanism and at least one tab projecting from at least one of the third and fourth side edges of the second loading ramp panel. The cam locking mechanism may be arranged to engage the tab and force the tab in the direction of the vertical access opening.

The first and second pair of cable supports may be arranged to permit translation of a cable therethrough and preferably define a curvilinear cable path. The fourth pair of cable supports are preferably arranged to secure respective ends of the load cable to the second panel. The first, second, and third pair of cable supports may comprise pulleys.

The cable translation mechanism may comprise a motor driven winding mechanism operative to wind and unwind the drive cable. The cable linkage assembly may comprise a drive bracket and a first linkage pulley, wherein the drive cable is secured to the drive bracket, the drive bracket is secured to the first linkage pulley, and the first linkage pulley is arranged to engage the load cable so as to couple movement of the drive cable with movement of the load cable. The first linkage pulley preferably engages the load cable so as to define first and second load cable portions on respective sides of a point of engagement of the first linkage pulley with the load cable. The first load cable portion is arranged to engage first ones of the first, second, third, and fourth pairs of cable supports and the second load cable portion is arranged to engage second ones of the first, second, third, and fourth pairs of cable supports.

The cable linkage assembly may further comprise first and second directional pulley assemblies, wherein one of the directional pulley assemblies is arranged to engage the first load cable portion and the second directional pulley assembly is arranged to engage the second load cable portion. The first directional pulley assembly directs the first load cable portion from a central portion of the horizontal top portion to one of the substantially vertical side portions and the second directional pulley assembly directs the second load cable portion from a central portion of the horizontal top portion to the other of the substantially vertical side portions.

The cable linkage assembly is preferably positioned substantially midway between the pair of substantially vertical side portions of the vertical access opening. The drive cable preferably extends from the cable linkage assembly to the cable drive assembly.

In accordance with yet another embodiment of the present invention, a loading ramp assembly is provided comprising first and second loading ramp panels, first, second, third, and fourth pairs of cable supports, a cable drive assembly, a load cable, and a cable linkage assembly.

The first loading ramp panel defines upper and lower panel surfaces, first and second transverse edges, and first and second side edges. The first transverse edge is secured proximate the bottom portion of the access opening so as to permit the first panel to pivot relative to the bottom portion of the access opening. The second loading ramp panel defines upper and lower panel surfaces, third and fourth transverse edges, and third and fourth side edges. The third transverse edge is secured proximate the second transverse edge of the first panel so as to permit the second panel to pivot relative to the first panel.

The first pair of cable supports include one support arranged along one of the pair of substantially vertical side portions of the access opening and another support arranged along the other of the pair of substantially vertical side portions of the access opening. The second pair of cable supports include one support arranged along the first side edge of the first panel and another support arranged along the second side edge of the first panel.

The third pair of cable supports include one support aligned with one of the second pair of cable supports and another support aligned with the other of the second pair of cable supports. The fourth pair of cable supports include one support arranged proximate the third side edge of the second panel and another support arranged proximate the fourth side edge of the second panel.

The cable drive assembly includes a drive cable and a cable translation mechanism. The load cable is secured between the respective ones of the fourth pair of cable supports and extends there between through the remaining cable supports. The cable linkage assembly is arranged to couple movement of the drive cable with movement of the load cable, wherein the linkage assembly and the cable supports are arranged to distribute a uniform load over the load cable.

Accordingly, it is an object of the present invention to provide a specialized loading ramp assembly and a recreational vehicle incorporating the loading ramp assembly. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which:

FIG. 7 is a schematic illustration of the operating mechanism which moves the combined tail gate and loading ramp of the present invention from the deployed to the retracted positions; and FIG. 8 is an illustration of the cable supports and leverage points defined by the loading ramp assembly of the present invention.

DETAILED DESCRIPTION OF THE PREFERRED EMBODIMENTS

Figure 1:
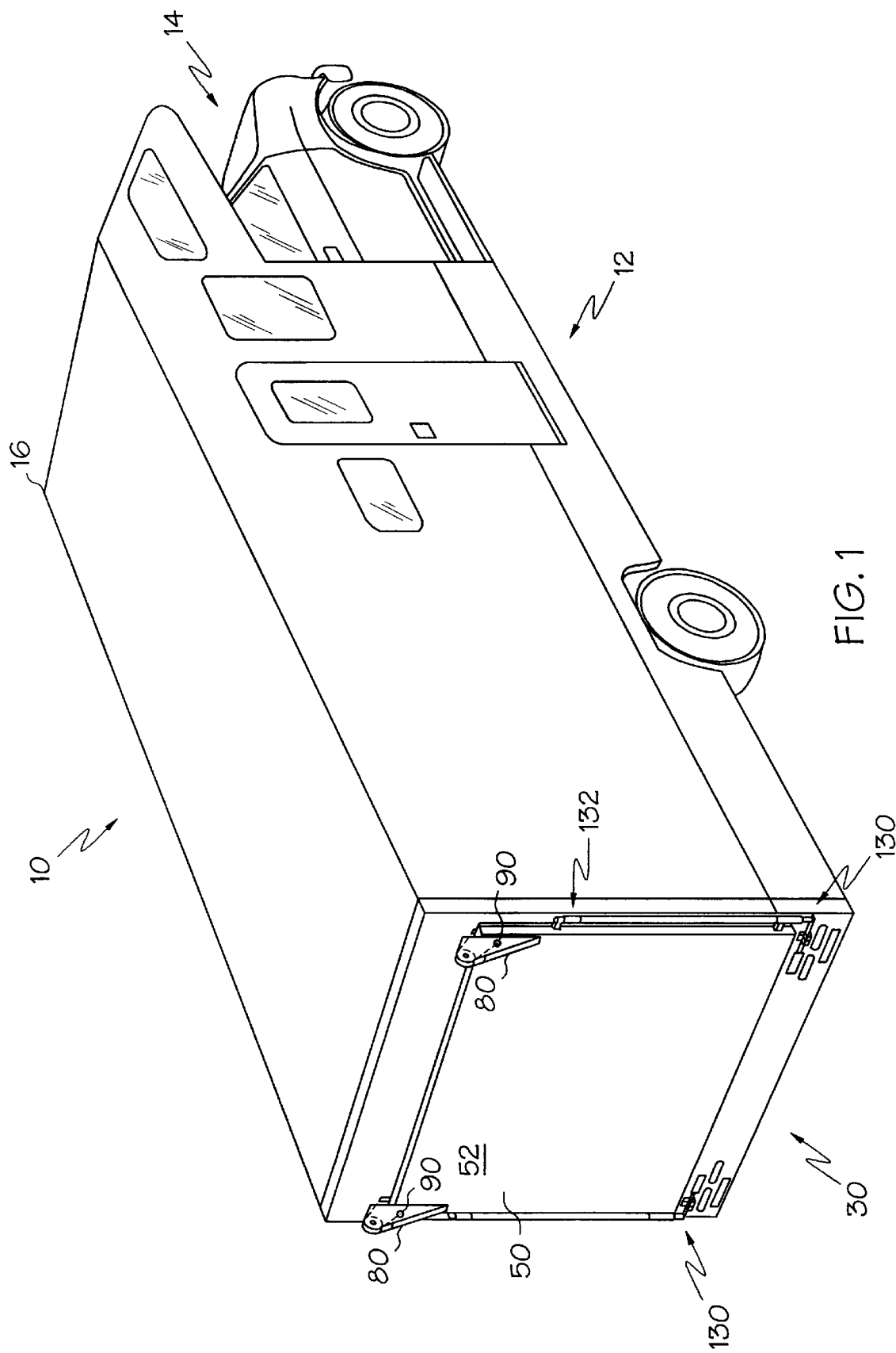
FIG. 1 is an isometric view of a recreational vehicle incorporating the teachings of the present invention.
Figure 2:
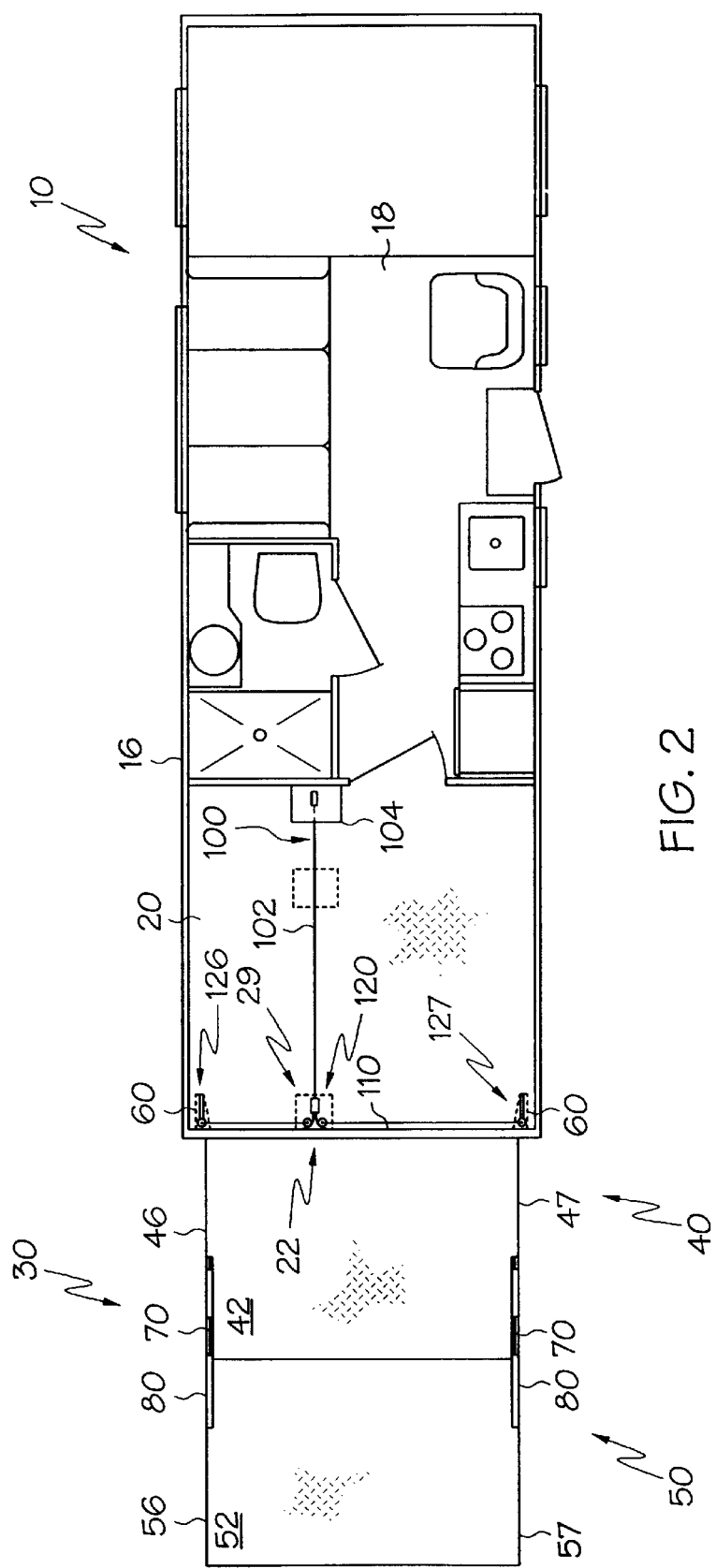
FIG. 2 is a plan view of the interior of the recreational vehicle illustrated in FIG. 1.

Referring now to FIGS. 1–8, the recreational vehicle 10 and loading ramp assembly 30 of the present invention are described in detail. The recreational vehicle 10 comprises a chassis 12 including a cab 14. A vehicle body 16 is mounted on the chassis 12 and includes a living area 18 and a storage area 20 defined within the body 16. A substantially vertical access opening 22 is defined in the storage area 20. The access opening 22 defines substantially horizontal top and bottom portions 24, 25 and a pair of substantially vertical side portions 26, 27 extending between the top and bottom portions 24, 25.

The loading ramp assembly 30 comprises a first loading ramp panel 40, a second loading ramp panel 50, a first pair of cable supports 60, a second pair of cable supports 70, a third pair of cable supports 80, a fourth pair of cable supports 90, a cable drive assembly 100, a load cable 110, and a cable linkage 120. For the purposes of describing and defining the present invention, it is noted that a cable, as recited herein, incorporates any longitudinal support member including, for example, a single or multi-strand cable, a chain, a rope, etc.

The first loading ramp panel 40 defines upper and lower panel surfaces 42, 43, first and second transverse edges 44, 45, and first and second side edges 46, 47. The first transverse edge 44 is secured proximate the bottom portion 25 of the access opening 22 with a first hinge assembly 48 so as to permit the first panel 40 to pivot relative to the bottom portion 25 of the access opening 22 about a first transverse axis 49 defined by the first hinge assembly 48.

The second loading ramp panel 50 defines upper and lower panel surfaces 52, 53, third and fourth transverse edges 54, 55, and third and fourth side edges 56, 57. The third transverse edge 54 is secured proximate the second transverse edge 45 of the first panel 40 with a second hinge assembly 58 so as to permit the second panel 50 to pivot relative to the first panel 40 about a second transverse axis 59 defined by the second hinge assembly 58.

The first pair of cable supports 60 are arranged along the respective vertical side portions 26, 27 of the access opening 22. The second pair of cable supports 70 are arranged along the respective side edges 46, 47 of the first panel 40. The third pair of cable supports 80 are aligned with the second pair of cable supports along the respective side edges 46, 47 of the first panel 40 and the respective side edges 56, 57 of the second panel 50. The fourth pair of cable supports 90 are arranged proximate the third and fourth side edges 56, 57 of the second panel 50.

The first and second pair of cable supports 60, 70 comprise pulleys defining a curvilinear cable path and, accordingly, are arranged to permit translation of the load cable 110 therethrough as the loading ramp assembly 30 is extended and retracted. Similarly, the third pair of cable supports 80 also comprise pulleys defining a curvilinear cable path. In contrast, the fourth pair of cable supports 90 are arranged to secure respective ends of the load cable 110 to the second panel 50. An additional pair of cable supports 72 are also provided in the illustrated embodiment to aid in directing the load cable 110 over the second transverse axis 59.

The cable drive assembly 100 includes a drive cable 102 and a cable translation mechanism 104. The drive cable 102 extends from the cable linkage assembly 120 to the cable translation mechanism 104. The cable translation mechanism 104 is preferably a motor driven spool or winding mechanism and includes appropriately designed circuitry that functions to initiate winding and unwinding of the drive cable 102, control cable tension, and ensure that proper wind and unwind limits are established to avoid cable tangling or excessive cable slack. The load cable 110 is secured between the respective ones of the fourth pair of cable supports 90 and extends there between through the remaining cable supports 60, 70, 80.

Figure 3:
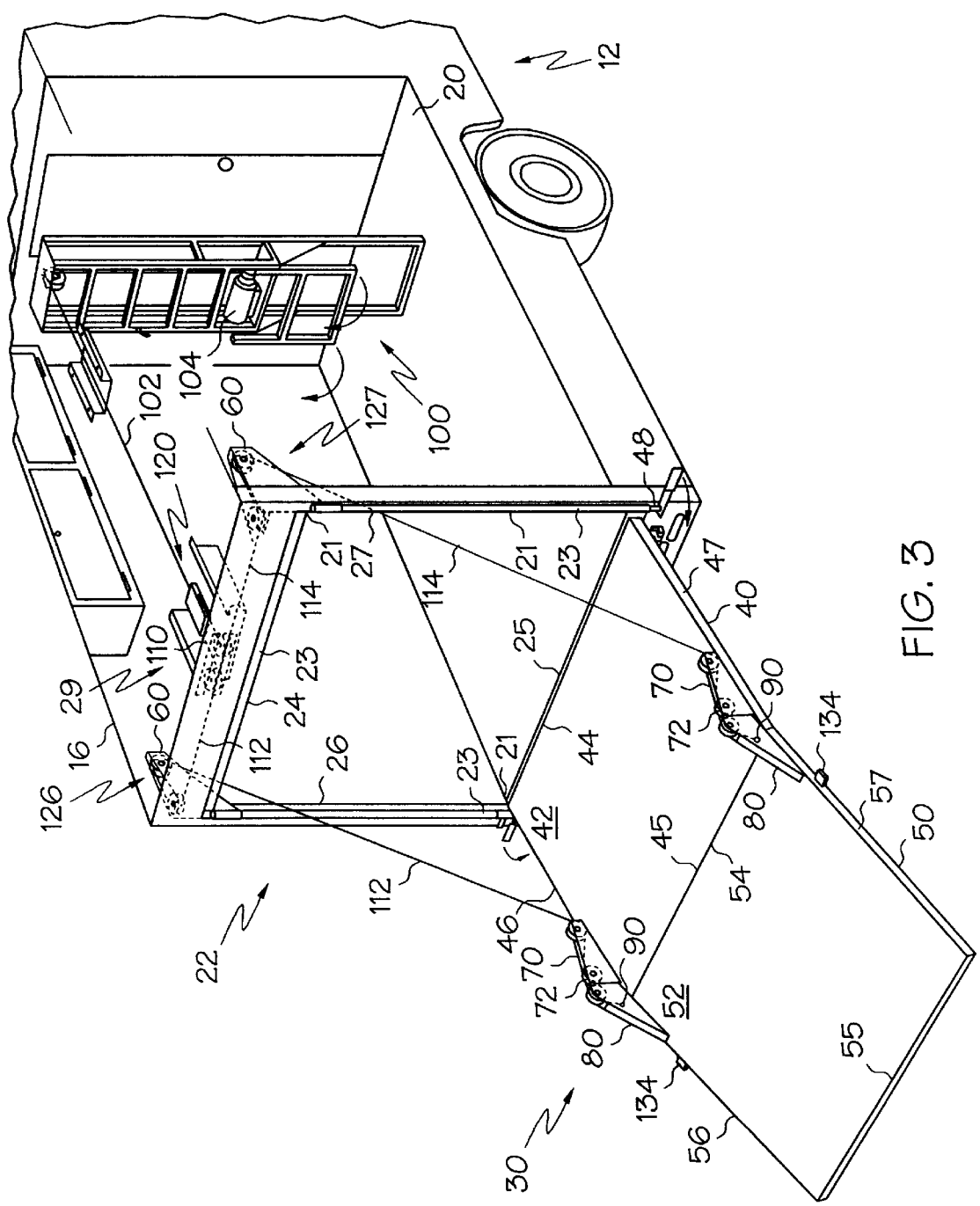
FIG. 3 is a fragmentary, cutaway view of the recreational vehicle illustrated in FIG. 1, illustrating the combination tail gate and ramp of the present invention in the deployed position to facilitate loading and unloading.

The cable linkage assembly 120 is positioned substantially midway between the pair of substantially vertical side portions 26, 27 of the vertical access opening 22 and is arranged to couple movement of the drive cable 102 with movement of the load cable 110. The linkage assembly 120 and the cable supports 60, 70, 80, 90 are arranged to distribute a uniform load over the load cable 110. Specifically, as is illustrated in FIG. 7, the cable linkage assembly 120 comprises a drive bracket 122 and a first linkage pulley 124. The drive cable 102 is secured to the drive bracket 122 and the drive bracket 122 is secured to the first linkage pulley 124. The first linkage pulley 124 is arranged to engage the load cable 110 so as to couple movement of the drive cable 102 with movement of the load cable 110. The first linkage pulley 124 engages the load cable 110 so as to define first and second load cable portions 112, 114 on respective sides of a point of engagement of the first linkage pulley 124 with the load cable 110. The first and second load cable portions 112, 114 are substantially the same length. As is illustrated in FIGS. 3 and 7, the first load cable portion 112 is arranged to engage first ones of the first, second, third, and fourth pairs of cable supports 60, 70, 80, 90 and the second load cable portion 114 is arranged to engage second ones of the first, second, third, and fourth pairs of cable supports 60, 70, 80, 90.

The cable linkage assembly 120 further comprises first and second directional pulley assemblies 126, 127, one of which is arranged to engage the first load cable portion 112 and direct it towards the first ones of the first, second, third, and fourth pairs of cable supports 60, 70, 80, 90, and the other of which is arranged to engage the second load cable portion 114 and direct it towards the second ones of the first, second, third, and fourth pairs of cable supports 60, 70, 80, 90. Further, additional pulleys 128, see FIG. 7, are provided to direct the first load cable portion 112 from a central, or near-central, portion 29 of the horizontal top portion 24 to the first substantially vertical side portion 26 and the second load cable portion 114 from the central portion 29 to the other substantially vertical side portion 27.

As is illustrated in FIG. 8, the first pair of cable supports 60 and the second pair of cable supports 70 define a first pair of leverage points 32, 33 and an associated first pair of substantially equal leverage angles α. Each of the first pair of leverage points 32, 33 are spaced a first predetermined distance a from the bottom portion 25 of the access opening 22 along the respective side edges 46, 47 of the first panel 40. The third pair of cable supports 80 and the fourth pair of cable supports 90 define a second pair of leverage points 34, 35 and an associated second pair of substantially equal leverage angles β. Each of the second pair of leverage points are spaced a second predetermined distance b from the third transverse edge 54 of the second panel 50 along the respective side edges 56, 57 of the second panel 50.

Figure 4:
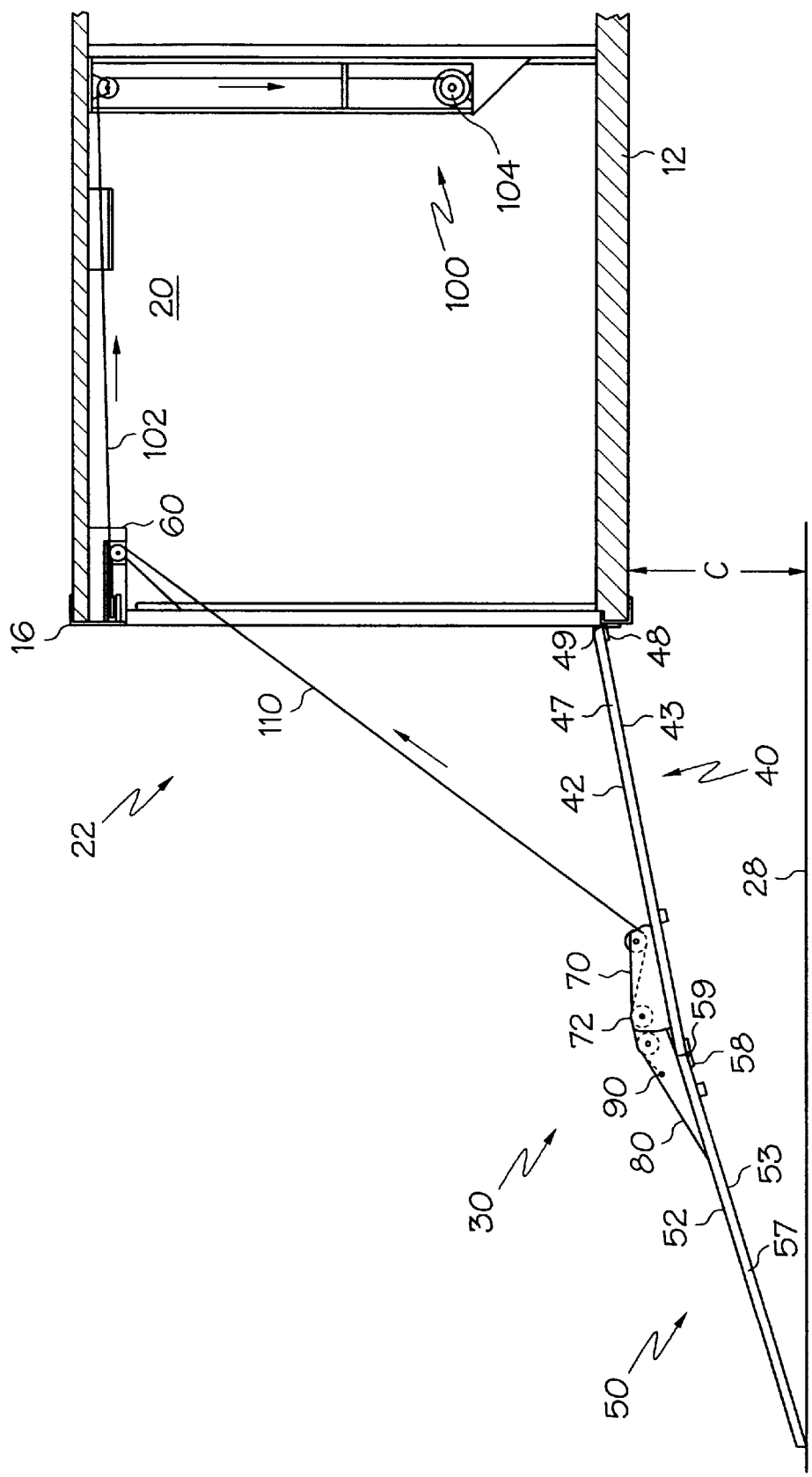
FIG. 4 is a fragmentary, vertical cross-sectional view of the rear portion of the recreational vehicle illustrated in FIGS. 1–3, illustrating the combined ramp and tail gate of the present invention in the deployed position.
Figure 5:
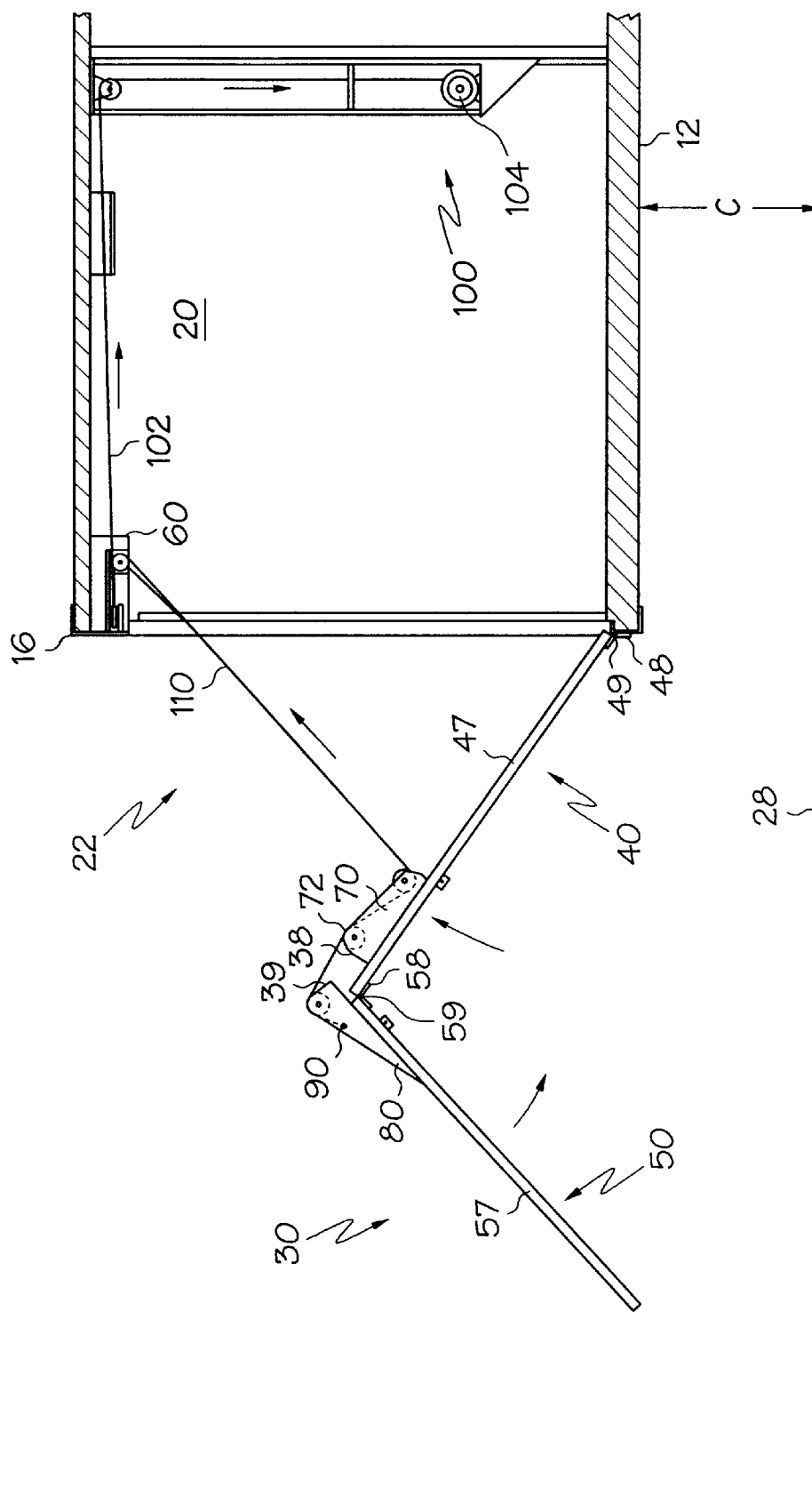
FIG. 5 is a view similar to FIG. 4, but illustrating the combined ramp and tail gate of the present invention in a position between the fully deployed and fully retracted positions.
Figure 6:
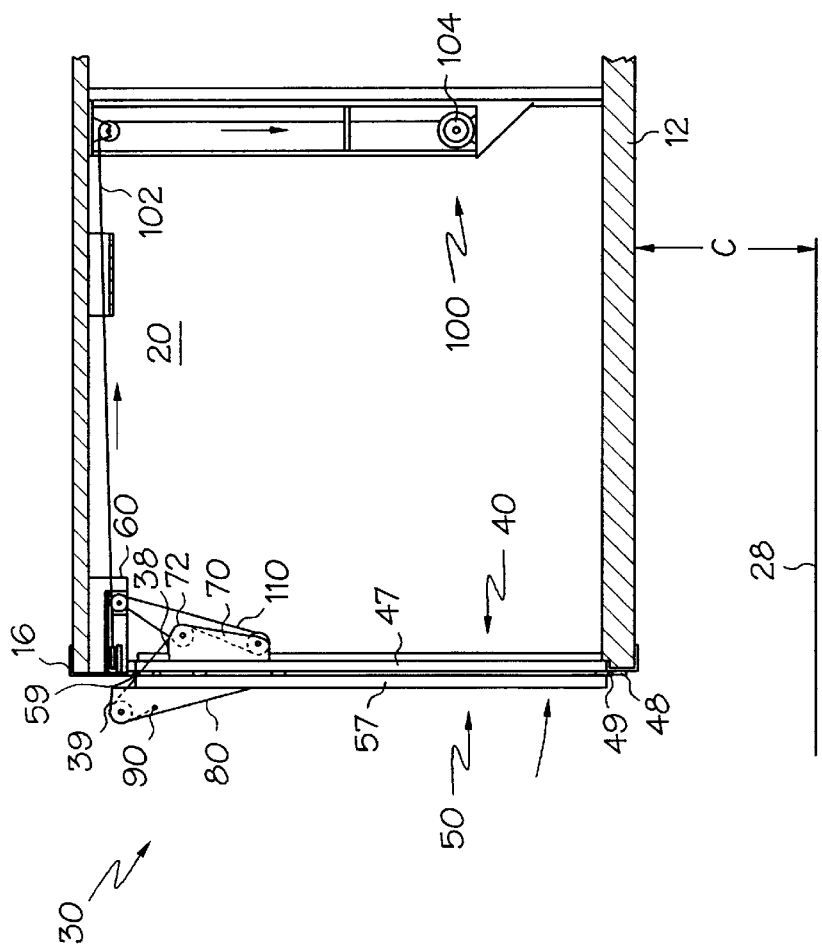
FIG. 6 is a view similar to FIGS. 4 and 5, but illustrating the combined ramp and tail gate in the fully retracted position.

As will be appreciated by those practicing the present invention, the value of the first leverage angle a varies as the first panel 40 pivots between the extended position (see FIGS. 3, 4, and 8) and the retracted position (see FIG. 6) and through an intermediate position (see FIG. 5). However, for the purposes of describing a preferred embodiment of the present invention, it is noted that, in the extended position, the value of the first predetermined distance a is about 80% of the length of the first panel 40 and the value of the first leverage angle α is about 40°. The second predetermined distance b is fixed at about 10% of the length of the second panel 50 and the second pair of leverage angles β are fixed at about 30°. Further, for the purposes of describing and defining the present invention, the above mentioned leverage points and angles are those points and angles defined by the loading ramp assembly 30 in the extended position.

The cable drive assembly 100, the first pair of leverage points 32, 33, and the associated first pair of substantially equal leverage angles α are arranged to define a first torque $\tau_1$ about the first transverse axis 49. Similarly, the cable drive assembly 100, the second pair of leverage points 34, 35, and the associated second pair of substantially equal leverage angles β are arranged to define a second torque $\tau_2$ about the second transverse axis 59. The first torque $\tau_1$ exceeds a first opposing gravitational torque $\tau_{G_1}$ of the first panel 40 about the first transverse axis 49 and the second torque $\tau_2$ is less than a second opposing gravitational torque $\tau_{G_2}$ of the second panel 50 about the second transverse axis. In this manner, the first loading ramp panel 40 and the second loading ramp panel 50 pivot in opposite directions as the cable drive assembly 100 is operated.

As will be appreciated by those practicing the present invention, the loading ramp assembly 30 of the present invention must be strong enough to support the weight of articles to be loaded in the storage area 20. Accordingly, the loading ramp assembly 30 of the present invention includes complementary pairs of abutment surfaces 38, 39 secured to the first and second panels 40, 50, see FIGS. 5 and 6. The abutment surfaces 38, 39 are arranged to limit the degree the second panel 50 is permitted to pivot about the axis defined by the second hinge assembly 58. In the illustrated embodiment, the abutment surfaces 38, 39 are defined at a point spaced from the second transverse edge 45 of the first panel 40 in the direction of the first transverse edge 44 of the first panel 40.

The first loading ramp panel 40, the second loading ramp panel 50, the second hinge assembly 58, and the abutment surfaces 38, 39 are arranged to permit the first and second panels 40, 50 to pivot between (i) a retracted position characterized by contact between the lower panel surfaces 43, 53 of the first and second panels 40, 50 (see FIG. 6), and (ii) an extended position defined between the retracted position and a position prior to a point at which the first and second panels 40, 50 would lie in a common plane (see FIGS. 3 and 4). The retracted position is characterized by substantially vertical alignment of the first and second panels 40, 50 and the extended position is characterized by a decreasing degree of inclination from the second panel 50 to the first panel 40.

According to a specific aspect of the present invention, the vehicle body 16 and the bottom portion of the access opening 22 are positioned at a predetermined height c above a ground-level reference 28 (see FIGS. 4–6 and 8). The loading ramp assembly 30 is arranged such that the first and second loading ramp panels 40, 50 reach the extended position (see FIGS. 4 and 8) no later than, and preferably simultaneously with, a point at which the fourth transverse edge 55 reaches the ground-level reference 28.

According to a particular advantageous feature of the present invention, the first panel 40 is at least as large as the vertical access opening 22 and the vertical access opening 22 defines an access opening periphery 21 including a peripheral seal 23. The first panel 40 is arranged to abut the peripheral seal 23 along substantially all of the access opening periphery 21 to seal the storage area 20 from the exterior. It is contemplated by the present invention that substantially all of the access opening periphery may merely include the horizontal top portion 24, and the vertical side portions 26, 27. To further facilitate a secure seal, respective locking assemblies 130 are arranged on opposite sides of the vertical access opening 22 to secure the first and second loading ramp panels 40, 50 in the retracted position. Each locking assembly 130 comprises a cam locking mechanism 132 and tabs 134 projecting from one of the side edges 56, 57 of the second loading ramp panel 50 (see FIG. 3). The cam locking mechanism 132 is arranged to engage the tabs 134 and force the tabs in the direction of the vertical access opening 22.

Having described the invention in detail and by reference to preferred embodiments thereof, it will be apparent that modifications and variations are possible without departing from the scope of the invention defined in the appended claims.

What is claimed is:

1. A recreational vehicle comprising:

a chassis including a cab;

a body mounted on said chassis and including a living area and a storage area defined within said body;

a substantially vertical access opening defined in said storage area, said access opening defining substantially horizontal top and bottom portions and a pair of substantially vertical side portions extending between said top and bottom portions;

a loading ramp assembly, said loading ramp assembly comprising a first loading ramp panel defining upper and lower panel surfaces, first and second transverse edges, and first and second side edges, wherein said first transverse edge is secured proximate said bottom portion of said access opening so as to permit said first panel to pivot relative to said bottom portion of said access opening;

a second loading ramp panel defining upper and lower panel surfaces, third and fourth transverse edges, and third and fourth side edges, wherein said third transverse edge is secured proximate said second transverse edge of said first panel so as to permit said second panel to pivot relative to said first panel;

a first pair of cable supports, one of which is arranged along one of said pair of substantially vertical side portions of said access opening and the other of which is arranged along the other of said pair of substantially vertical side portions of said access opening;

a second pair of cable supports, one of which is arranged along said first side edge of said first panel and the other of which is arranged along said second side edge of said first panel;

a third pair of cable supports, one of said third pair of cable supports being aligned with one of said second pair of cable supports and the other of said third pair of cable supports being aligned with the other of said second pair of cable supports;

a fourth pair of cable supports, one of said fourth pair of cable supports arranged proximate said third side edge of said second panel and the other of said fourth pair of cable supports arranged proximate said fourth side edge of said second panel;

a cable drive assembly including a drive cable and a cable translation mechanism;

a load cable secured between said respective ones of said fourth pair of cable supports and extending there between through the remaining cable supports;

a cable linkage assembly arranged to couple movement of said drive cable with movement of said load cable.

2. A vehicle comprising a substantially vertical access opening defining substantially horizontal top and bottom portions, a pair of substantially vertical side portions extending between said top and bottom portions, and a loading ramp assembly, said loading ramp assembly comprising:

a first loading ramp panel defining upper and lower panel surfaces, first and second transverse edges, and first and second side edges, wherein said first transverse edge is secured proximate said bottom portion of said access opening so as to permit said first panel to pivot relative to said bottom portion of said access opening;

a second loading ramp panel defining upper and lower panel surfaces, third and fourth transverse edges, and third and fourth side edges, wherein said third transverse edge is secured proximate said second transverse edge of said first panel so as to permit said second panel to pivot relative to said first panel;

a first pair of cable supports, one of which is arranged along one of said pair of substantially vertical side portions of said access opening and the other of which is arranged along the other of said pair of substantially vertical side portions of said access opening;

a second pair of cable supports, one of which is arranged along said first side edge of said first panel and the other of which is arranged along said second side edge of said first panel;

a third pair of cable supports, one of said third pair of cable supports being aligned with one of said second pair of cable supports and the other of said third pair of cable supports being aligned with the other of said second pair of cable supports;

a fourth pair of cable supports, one of said fourth pair of cable supports arranged proximate said third side edge of said second panel and the other of said fourth pair of cable supports arranged proximate said fourth side edge of said second panel;

a cable drive assembly including a drive cable and a cable translation mechanism;

a load cable secured between said respective ones of said fourth pair of cable supports and extending there between through the remaining cable supports;

a cable linkage assembly arranged to couple movement of said drive cable with movement of said load cable.

3. A vehicle as claimed in claim 2 wherein:

said first pair of cable supports and said second pair of cable supports define a first pair of leverage points and an associated first pair of substantially equal leverage angles, one of said first pair of leverage points being spaced a first predetermined distance from said bottom portion of said access opening along said first side edge of said first panel and the other of said first pair of leverage points being spaced said first predetermined distance from said bottom portion of said access opening along said second side edge of said first panel; and said third pair of cable supports and said fourth pair of cable supports define a second pair of leverage points and an associated second pair of substantially equal leverage angles, one of said second pair of leverage points being spaced a second predetermined distance from said third transverse edge of said second panel along said first side edge and the other of said second pair of leverage points being spaced said second predetermined distance from said third transverse edge of said second panel along said second side edge.

4. A vehicle as claimed in claim 3 wherein said first predetermined distance is greater than said second predetermined distance.

5. A vehicle as claimed in claim 3 wherein said first pair of leverage angles are greater than said second pair of leverage angles.

6. A vehicle as claimed in claim 3 wherein said cable drive assembly, said first pair of leverage points, and said associated first pair of substantially equal leverage angles are arranged to define a first torque about a first pivot axis of said first panel, and wherein said cable drive assembly, said second pair of leverage points, and said associated second pair of substantially equal leverage angles are arranged to define a second toque about a second pivot axis of said second panel.

7. A vehicle as claimed in claim 6 wherein said first torque is greater than said second torque.

8. A vehicle as claimed in claim 6 wherein said first torque exceeds a first opposing gravitational torque of said first panel about said first pivot, and wherein said second torque is less than a second opposing gravitational torque of said second panel about said second pivot axis, whereby said first loading ramp panel and said second loading ramp panel pivot in opposite directions as said cable drive assembly is operated.

9. A vehicle as claimed in claim 2 wherein said first transverse edge of said first loading ramp panel is secured to said bottom portion of said access opening with a first hinge assembly arranged to permit said first panel to pivot relative to said access opening about a first transverse axis defined by said first hinge assembly.

10. A vehicle as claimed in claim 2 wherein said third transverse edge of said second loading ramp panel is secured to said second transverse edge of said first loading ramp panel with a second hinge assembly arranged to permit said second panel to pivot relative to said first panel about a second transverse axis defined by said second hinge assembly.

11. A vehicle as claimed in claim 10 further comprising an abutment surface secured to at least one of said first and second panels, wherein said abutment surface is arranged to limit the degree said second panel is permitted to pivot about said axis defined by said second hinge assembly.

12. A vehicle as claimed in claim 11 wherein said abutment surface comprises complementary abutment surfaces, one of which is secured to said first panel and one of which is secured to said second panel.

13. A vehicle as claimed in claim 12 wherein said first loading ramp panel, said second loading ramp panel, said second hinge assembly, and said abutment surface are arranged to permit said first and second panels to pivot between a retracted position characterized by contact between said lower panel surfaces of said first and second panels, and an extended position defined between said retracted position and a position prior to a point at which said first and second panels would lie in a common plane.

14. A vehicle as claimed in claim 13 wherein said bottom portion of said access opening is positioned at a predetermined height above a ground-level reference, and wherein said loading ramp assembly is arranged such that said first and second loading ramp panels reach said extended position no later than a point at which said fourth transverse edge reaches said ground-level reference.

15. A vehicle as claimed in claim 14 wherein said loading ramp assembly is arranged such that said first and second loading ramp panels reach said extended position as said fourth transverse edge reaches said ground-level reference.

16. A vehicle as claimed in claim 11 wherein said abutment surface is defined at a point spaced from the second transverse edge of said first panel in the direction of said first transverse edge of said first panel.

17. A vehicle as claimed in claim 2 wherein said first, second, third, and fourth pair of cable supports are arranged such that said first loading ramp panel and said second loading ramp panel pivot in opposite directions as said cable drive assembly is operated.

18. A vehicle as claimed in claim 2 wherein said first panel and said first hinge assembly are arranged to permit said second panel to pivot between an extended position and a retracted position, and wherein said retracted position is characterized by substantially vertical alignment of said first panel over said vertical access opening.

19. A vehicle as claimed in claim 18 wherein said first panel is at least as large as said vertical access opening.

20. A vehicle as claimed in claim 19 wherein said vertical access opening defines an access opening periphery, wherein a peripheral seal is arranged along said access opening periphery, and wherein said first panel is arranged to abut said peripheral seal along substantially all of said access opening periphery.

21. A vehicle as claimed in claim 2 further comprising a locking assembly arranged to secure said first and second loading ramp panels in a retracted position, wherein said retracted position is characterized by contact between said lower panel surfaces of said first and second panels.

22. A vehicle as claimed in claim 21 wherein said locking assembly comprises a cam locking mechanism and at least one tab projecting from at least one of the third and fourth side edges of said second loading ramp panel, and wherein said cam locking mechanism is arranged to engage said tab and force said tab in the direction of said vertical access opening.

23. A vehicle as claimed in claim 2 wherein said first and second pair of cable supports are arranged to permit translation of a cable therethrough.

24. A vehicle as claimed in claim 2 wherein said first, second, and third pair of cable supports define a curvilinear cable path.

25. A vehicle as claimed in claim 2 wherein said fourth pair of cable supports are arranged to secure respective ends of said load cable to said second panel.

26. A vehicle as claimed in claim 2 wherein said first, second, and third pair of cable supports comprise pulleys.

27. A vehicle as claimed in claim 2 wherein said cable translation mechanism comprises a motor driven winding mechanism operative to wind and unwind said drive cable.

28. A vehicle as claimed in claim 2 wherein said cable linkage assembly comprises a drive bracket and a first linkage pulley, wherein:

said drive cable is secured to said drive bracket, said drive bracket is secured to said first linkage pulley, and said first linkage pulley is arranged to engage said load cable so as to couple movement of said drive cable with movement of said load cable.

29. A vehicle as claimed in claim 28 wherein said first linkage pulley engages said load cable so as to define first and second load cable portions on respective sides of a point of engagement of said first linkage pulley with said load cable, wherein said first load cable portion is arranged to engage first ones of said first, second, third, and fourth pairs of cable supports, and wherein said second load cable portion is arranged to engage second ones of said first, second, third, and fourth pairs of cable supports.

30. A vehicle as claimed in claim 29 wherein said cable linkage assembly further comprises first and second directional pulley assemblies, wherein one of said directional pulley assemblies is arranged to engage said first load cable portion and said second directional pulley assembly is arranged to engage said second load cable portion.

31. A vehicle as claimed in claim 30 wherein said first directional pulley assembly directs said first load cable portion from a central portion of said horizontal top portion to one of said substantially vertical side portions, and wherein said second directional pulley assembly directs said second load cable portion from a central portion of said horizontal top portion to the other of said substantially vertical side portions.

32. A vehicle as claimed in claim 29 wherein said first and second load cable portions are substantially the same length.

33. A vehicle as claimed in claim 2 wherein said cable linkage assembly is positioned substantially midway between said pair of substantially vertical side portions of said vertical access opening.

34. A vehicle as claimed in claim 33 wherein said drive cable extends from said cable linkage assembly to said cable drive assembly.

35. A vehicle as claimed in claim 2 wherein said loading ramp assembly is arranged to permit said first and second loading ramp panels to pivot in opposite directions between an extended position and a retracted position, wherein said retracted position is characterized by substantially vertical alignment of said first and second panels, and wherein said extended position is characterized by a decreasing degree of inclination from said first panel to said second panel.

36. A loading ramp assembly comprising:

a first loading ramp panel defining upper and lower panel surfaces, first and second transverse edges, and first and second side edges, wherein said first transverse edge defines a loading platform height and is arranged to be secured proximate a loading platform so as to permit said first panel to pivot relative to said loading platform;

a second loading ramp panel defining upper and lower panel surfaces, third and fourth transverse edges, and third and fourth side edges, wherein said third transverse edge is secured proximate said second transverse edge of said first panel so as to permit said second panel to pivot relative to said first panel;

a first pair of cable supports, one of which is arranged to be secured a first vertical distance above one side of said loading platform and the other of which is arranged to be secured said first vertical distance above an opposite side of said loading platform;

a second pair of cable supports, one of which is arranged along said first side edge of said first panel and the other of which is arranged along said second side edge of said first panel;

a third pair of cable supports, one of said third pair of cable supports being aligned with one of said second pair of cable supports and the other of said third pair of cable supports being aligned with the other of said second pair of cable supports;

a fourth pair of cable supports, one of said fourth pair of cable supports arranged proximate said third side edge of said second panel and the other of said fourth pair of cable supports arranged proximate said fourth side edge of said second panel;

a cable drive assembly including a drive cable and a cable translation mechanism;

a load cable secured between said respective ones of said fourth pair of cable supports and extending there between through the remaining cable supports;

a cable linkage assembly arranged to couple movement of said drive cable with movement of said load cable.

* * * * *